(12) United States Patent
Kato et al.

(10) Patent No.: US 8,596,545 B2
(45) Date of Patent: Dec. 3, 2013

(54) COMPONENT OF WIRELESS IC DEVICE AND WIRELESS IC DEVICE

(75) Inventors: Noboru Kato, Moriyama (JP); Jun Sasaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/944,099

(22) Filed: Nov. 11, 2010

(65) Prior Publication Data

US 2011/0062244 A1     Mar. 17, 2011

Related U.S. Application Data

(63) Continuation of application No. PCT/JP2009/059669, filed on May 27, 2009.

(30) Foreign Application Priority Data

May 28, 2008 (JP) .................................. 2008-139717

(51) Int. Cl.
  *G06K 19/06* (2006.01)
  *H01L 23/02* (2006.01)

(52) U.S. Cl.
  USPC ............................ 235/492; 257/679; 235/439

(58) Field of Classification Search
  USPC ........ 235/492, 492.41, 439; 340/12.51, 13.26
  See application file for complete search history.

(56) References Cited

U.S. PATENT DOCUMENTS

| | | | |
|---|---|---|---|
| 3,364,564 A | 1/1968 | Kurtz et al. | |
| 4,794,397 A | 12/1988 | Ohe et al. | |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |
| 5,854,480 A | 12/1998 | Noto | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |

(Continued)

FOREIGN PATENT DOCUMENTS

DE  10 2006 057 369 A1  6/2008
EP    0 694 874 A2    1/1996

(Continued)

OTHER PUBLICATIONS

Official Communication issued in International Patent Application No. PCT/JP2008/063025, mailed on Aug. 12, 2008

(Continued)

*Primary Examiner* — Thien M Le
*Assistant Examiner* — Toan Ly
(74) *Attorney, Agent, or Firm* — Keating & Bennett, LLP

(57) ABSTRACT

A component of a wireless IC device includes a wireless IC chip and a feeding circuit substrate including a plurality of laminated resin layers. The wireless IC chip is included inside the feeding circuit substrate, and an annular electrode is arranged inside the feeding circuit substrate. The component of a wireless IC device and the radiation plate define the wireless IC device.

11 Claims, 6 Drawing Sheets

(56) References Cited

U.S. PATENT DOCUMENTS

| | | | |
|---|---|---|---|
| 6,104,311 | A | 8/2000 | Lastinger |
| 6,107,920 | A * | 8/2000 | Eberhardt et al. .......... 340/572.7 |
| 6,172,608 | B1 | 1/2001 | Cole |
| 6,181,287 | B1 | 1/2001 | Beigel |
| 6,190,942 | B1 | 2/2001 | Wilm et al. |
| 6,249,258 | B1 | 6/2001 | Bloch et al. |
| 6,259,369 | B1 | 7/2001 | Monico |
| 6,271,803 | B1 | 8/2001 | Watanabe et al. |
| 6,335,686 | B1 | 1/2002 | Goff et al. |
| 6,362,784 | B1 | 3/2002 | Kane et al. |
| 6,367,143 | B1 | 4/2002 | Sugimura |
| 6,378,774 | B1 | 4/2002 | Emori et al. |
| 6,406,990 | B1 | 6/2002 | Kawai |
| 6,448,874 | B1 | 9/2002 | Shiino et al. |
| 6,459,588 | B1 * | 10/2002 | Morizumi et al. ............ 361/737 |
| 6,462,716 | B1 | 10/2002 | Kushihi |
| 6,542,050 | B1 | 4/2003 | Arai et al. |
| 6,600,459 | B2 | 7/2003 | Yokoshima et al. |
| 6,634,564 | B2 | 10/2003 | Kuramochi |
| 6,664,645 | B2 | 12/2003 | Kawai |
| 6,763,254 | B2 | 7/2004 | Nishikawa |
| 6,796,508 | B2 * | 9/2004 | Muller .......................... 235/492 |
| 6,812,707 | B2 | 11/2004 | Yonezawa et al. |
| 6,828,881 | B2 | 12/2004 | Mizutani et al. |
| 6,837,438 | B1 | 1/2005 | Takasugi et al. |
| 6,861,731 | B2 | 3/2005 | Buijsman et al. |
| 6,927,738 | B2 | 8/2005 | Senba et al. |
| 6,963,729 | B2 | 11/2005 | Uozumi |
| 7,088,249 | B2 | 8/2006 | Senba et al. |
| 7,088,307 | B2 | 8/2006 | Imaizumi |
| 7,112,952 | B2 | 9/2006 | Arai et al. |
| 7,119,693 | B1 | 10/2006 | Devilbiss |
| 7,129,834 | B2 | 10/2006 | Naruse et al. |
| 7,248,221 | B2 | 7/2007 | Kai et al. |
| 7,250,910 | B2 | 7/2007 | Yoshikawa et al. |
| 7,276,929 | B2 | 10/2007 | Arai et al. |
| 7,317,396 | B2 | 1/2008 | Ujino |
| 7,405,664 | B2 | 7/2008 | Sakama et al. |
| 2001/0030060 | A1 * | 10/2001 | Carroll ........................... 174/260 |
| 2002/0011967 | A1 | 1/2002 | Goff et al. |
| 2002/0015002 | A1 | 2/2002 | Yasukawa et al. |
| 2002/0044092 | A1 | 4/2002 | Kushihi |
| 2002/0067316 | A1 | 6/2002 | Yokoshima et al. |
| 2002/0093457 | A1 | 7/2002 | Hamada et al. |
| 2003/0006901 | A1 | 1/2003 | Kim et al. |
| 2003/0020661 | A1 | 1/2003 | Sato |
| 2003/0045324 | A1 | 3/2003 | Nagumo et al. |
| 2003/0169153 | A1 | 9/2003 | Muller |
| 2004/0001027 | A1 | 1/2004 | Killen et al. |
| 2004/0026519 | A1 | 2/2004 | Usami et al. |
| 2004/0056823 | A1 | 3/2004 | Zuk et al. |
| 2004/0066617 | A1 | 4/2004 | Hirabayashi et al. |
| 2004/0217915 | A1 | 11/2004 | Imaizumi |
| 2004/0219956 | A1 | 11/2004 | Iwai et al. |
| 2004/0227673 | A1 | 11/2004 | Iwai et al. |
| 2004/0252064 | A1 | 12/2004 | Yuanzhu |
| 2005/0092836 | A1 | 5/2005 | Kudo |
| 2005/0099337 | A1 | 5/2005 | Takei et al. |
| 2005/0125093 | A1 | 6/2005 | Kikuchi et al. |
| 2005/0134460 | A1 | 6/2005 | Usami |
| 2005/0134506 | A1 | 6/2005 | Egbert |
| 2005/0138798 | A1 | 6/2005 | Sakama et al. |
| 2005/0140512 | A1 | 6/2005 | Sakama et al. |
| 2005/0232412 | A1 | 10/2005 | Ichihara et al. |
| 2005/0236623 | A1 | 10/2005 | Takechi et al. |
| 2005/0275539 | A1 | 12/2005 | Sakama et al. |
| 2006/0001138 | A1 | 1/2006 | Sakama et al. |
| 2006/0032926 | A1 | 2/2006 | Baba et al. |
| 2006/0044192 | A1 | 3/2006 | Egbert |
| 2006/0055601 | A1 | 3/2006 | Kameda et al. |
| 2006/0071084 | A1 | 4/2006 | Detig et al. |
| 2006/0081397 | A1 * | 4/2006 | Enchi et al. ................... 174/260 |
| 2006/0109185 | A1 | 5/2006 | Iwai et al. |
| 2006/0145872 | A1 | 7/2006 | Tanaka et al. |
| 2006/0158380 | A1 | 7/2006 | Son et al. |
| 2006/0170606 | A1 | 8/2006 | Yamagajo et al. |
| 2006/0214801 | A1 | 9/2006 | Murofushi et al. |
| 2006/0220871 | A1 | 10/2006 | Baba et al. |
| 2006/0244676 | A1 | 11/2006 | Uesaka |
| 2006/0267138 | A1 | 11/2006 | Kobayashi |
| 2007/0004028 | A1 | 1/2007 | Lair et al. |
| 2007/0018893 | A1 | 1/2007 | Kai et al. |
| 2007/0040028 | A1 | 2/2007 | Kawamata |
| 2007/0052613 | A1 | 3/2007 | Gallschuetz et al. |
| 2007/0057854 | A1 | 3/2007 | Oodachi et al. |
| 2007/0069037 | A1 | 3/2007 | Kawai |
| 2007/0069836 | A1 * | 3/2007 | Sato et al. ....................... 333/185 |
| 2007/0095926 | A1 * | 5/2007 | Zhu et al. ....................... 235/492 |
| 2007/0132591 | A1 | 6/2007 | Khatri |
| 2007/0164414 | A1 * | 7/2007 | Dokai et al. ................... 257/679 |
| 2007/0200782 | A1 | 8/2007 | Hayama et al. |
| 2007/0229276 | A1 | 10/2007 | Yamagajo et al. |
| 2007/0252700 | A1 | 11/2007 | Ishihara et al. |
| 2007/0252703 | A1 | 11/2007 | Kato et al. |
| 2007/0285247 | A1 * | 12/2007 | Forster ........................ 340/572.1 |
| 2007/0285335 | A1 | 12/2007 | Bungo et al. |
| 2007/0290928 | A1 | 12/2007 | Chang et al. |
| 2008/0024156 | A1 | 1/2008 | Arai et al. |
| 2008/0087990 | A1 | 4/2008 | Kato et al. |
| 2008/0169905 | A1 | 7/2008 | Slatter |
| 2008/0272885 | A1 | 11/2008 | Atherton |
| 2009/0002130 | A1 | 1/2009 | Kato |
| 2009/0009007 | A1 | 1/2009 | Kato et al. |
| 2009/0021446 | A1 | 1/2009 | Kataya et al. |
| 2009/0065594 | A1 | 3/2009 | Kato et al. |
| 2009/0109102 | A1 | 4/2009 | Dokai et al. |
| 2009/0160719 | A1 | 6/2009 | Kato et al. |
| 2009/0201116 | A1 | 8/2009 | Orihara |
| 2009/0224061 | A1 | 9/2009 | Kato et al. |
| 2009/0231106 | A1 | 9/2009 | Okamura |
| 2009/0262041 | A1 | 10/2009 | Ikemoto et al. |
| 2009/0278687 | A1 | 11/2009 | Kato |

FOREIGN PATENT DOCUMENTS

| | | | |
|---|---|---|---|
| EP | 0 977 145 | A2 | 2/2000 |
| EP | 1 010 543 | A1 | 6/2000 |
| EP | 1 160 915 | A2 | 12/2001 |
| EP | 1 170 795 | A2 | 1/2002 |
| EP | 1 227 540 | A1 | 7/2002 |
| EP | 1 280 232 | A1 | 1/2003 |
| EP | 1 280 350 | A1 | 1/2003 |
| EP | 1 343 223 | A1 | 9/2003 |
| EP | 1 357 511 | A2 | 10/2003 |
| EP | 1 548 872 | A1 | 6/2005 |
| EP | 1 703 589 | A1 | 9/2006 |
| EP | 1 744 398 | A1 | 1/2007 |
| EP | 1 841 005 | A1 | 10/2007 |
| EP | 1 865 574 | A1 | 12/2007 |
| EP | 1 976 056 | A1 | 10/2008 |
| EP | 1 993 170 | A1 | 11/2008 |
| EP | 2 009 738 | A1 | 12/2008 |
| EP | 2 012 258 | A1 | 1/2009 |
| EP | 2 148 449 | A1 | 1/2010 |
| EP | 2 251 934 | A1 | 11/2010 |
| GB | 2 305 075 | A | 3/1997 |
| JP | 50-143451 | A | 11/1975 |
| JP | 62-127140 | U | 8/1987 |
| JP | 02-164105 | A | 6/1990 |
| JP | 03-262313 | A | 11/1991 |
| JP | 04-150011 | A | 5/1992 |
| JP | 04-167500 | A | 6/1992 |
| JP | 05-327331 | A | 12/1993 |
| JP | 6-53733 | A | 2/1994 |
| JP | 06-077729 | A | 3/1994 |
| JP | 06-177635 | A | 6/1994 |
| JP | 6-260949 | A | 9/1994 |
| JP | 07-183836 | A | 7/1995 |
| JP | 08-056113 | A | 2/1996 |
| JP | 8-87580 | A | 4/1996 |
| JP | 08-88586 | A | 4/1996 |
| JP | 08-088586 | A | 4/1996 |
| JP | 11-149537 | A | 6/1996 |
| JP | 08-176421 | A | 7/1996 |

(56) References Cited

FOREIGN PATENT DOCUMENTS

| | | |
|---|---|---|
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-69533 A | 3/1998 |
| JP | 10-505466 A | 5/1998 |
| JP | 10-171954 A | 6/1998 |
| JP | 10-193849 A | 7/1998 |
| JP | 10-193851 A | 7/1998 |
| JP | 10-293828 A | 11/1998 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 3075400 U | 11/2000 |
| JP | 2000-349680 A | 12/2000 |
| JP | 2001-10264 A | 1/2001 |
| JP | 2001-028036 A | 1/2001 |
| JP | 2007-18067 A | 1/2001 |
| JP | 2001-043340 A | 2/2001 |
| JP | 2001-66990 A | 3/2001 |
| JP | 2001-76111 A | 3/2001 |
| JP | 2001-505682 A | 4/2001 |
| JP | 2001-168628 A | 6/2001 |
| JP | 2001-188890 A | 7/2001 |
| JP | 2001-240046 A | 9/2001 |
| JP | 2001-256457 A | 9/2001 |
| JP | 2001-257292 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351084 A | 12/2001 |
| JP | 2001-352176 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-063557 A | 2/2002 |
| JP | 2002-505645 A | 2/2002 |
| JP | 2002-76750 A | 3/2002 |
| JP | 2002-076750 A | 3/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-522849 A | 7/2002 |
| JP | 2002-230128 A | 8/2002 |
| JP | 2002-232221 A | 8/2002 |
| JP | 2002-252117 A | 9/2002 |
| JP | 2002-259934 A | 9/2002 |
| JP | 2002-280821 A | 9/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-026177 A | 1/2003 |
| JP | 2003-030612 A | 1/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2003-536302 A | 12/2003 |

(56) References Cited

FOREIGN PATENT DOCUMENTS

| | | |
|---|---|---|
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-127230 A | 4/2004 |
| JP | 2004-213582 A | 7/2004 |
| JP | 2004-519916 A | 7/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-287767 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-124061 A | 5/2005 |
| JP | 2005-128592 A | 5/2005 |
| JP | 2005-129019 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-284352 A | 10/2005 |
| JP | 2005-293537 A | 10/2005 |
| JP | 2005-295135 A | 10/2005 |
| JP | 2005-311205 A | 11/2005 |
| JP | 2005-321305 A | 11/2005 |
| JP | 2005-322119 A | 11/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-13976 A | 1/2006 |
| JP | 2006-025390 A | 1/2006 |
| JP | 2006-031766 A | 2/2006 |
| JP | 2006-39902 A | 2/2006 |
| JP | 2006-42059 A | 2/2006 |
| JP | 2006-42097 A | 2/2006 |
| JP | 2006-053833 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-270212 A | 10/2006 |
| JP | 2006-270766 A | 10/2006 |
| JP | 2006-285911 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-28002 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-102348 A | 4/2007 |
| JP | 2007-122542 A | 5/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-172369 A | 7/2007 |
| JP | 2007-172527 A | 7/2007 |
| JP | 2007-228325 A | 9/2007 |
| JP | 2007-266999 A | 10/2007 |
| JP | 2007-272264 A | 10/2007 |
| JP | 2007-287128 A | 11/2007 |
| JP | 2007-312350 A | 11/2007 |
| JP | 2007-324865 A | 12/2007 |
| JP | 2008-033716 A | 2/2008 |
| JP | 2008-72243 A | 3/2008 |
| JP | 2008-097426 A | 4/2008 |
| JP | 4069958 B2 | 4/2008 |
| JP | 2008-107947 A | 5/2008 |
| JP | 2008-148345 A | 6/2008 |
| JP | 2008-519347 A | 6/2008 |
| JP | 2008-160874 A | 7/2008 |
| JP | 11-175678 A | 1/2009 |
| JP | 2009-25870 A | 2/2009 |
| JP | 2009-27291 A | 2/2009 |
| JP | 2009-044715 A | 2/2009 |
| NL | 9100176 A | 3/1992 |
| NL | 9100347 A | 3/1992 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/114821 A1 | 11/2006 |
| WO | 2007/083574 A1 | 7/2007 |
| WO | 2007/083575 A1 | 7/2007 |
| WO | 2007/086130 A1 | 8/2007 |
| WO | 2007/102360 A1 | 9/2007 |
| WO | 2007/119310 A1 | 10/2007 |
| WO | 2007/125683 A1 | 11/2007 |
| WO | 2007/138857 A1 | 12/2007 |
| WO | 2008/007606 A | 1/2008 |
| WO | 2008/126458 A1 | 10/2008 |
| WO | 2008/140037 A1 | 11/2008 |
| WO | 2008/142957 A1 | 11/2008 |

(56) References Cited

FOREIGN PATENT DOCUMENTS

| WO | 2009/011376 A1 | 1/2009 |
|---|---|---|
| WO | 2009/081719 A1 | 7/2009 |
| WO | 2009/110381 A1 | 9/2009 |

OTHER PUBLICATIONS

Official Communication issued in International Patent Application No. PCT/JP2009/053693, mailed on Jun. 9, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official communication issued in counterpart International Application No. PCT/JP2008/056026, mailed Jul. 1, 2008.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., LTD, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Kato et al.: "Antenna"; U.S. Appl. No. 11/688,290, filed Mar. 20, 2007.
Kato et al: "Information Terminal Device"; U.S. Appl. No. 12/267,666, filed Nov. 10, 2008.
Official communication issued in related U.S. Application No. 12/042,399; mailed on Aug. 25, 2008.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.

(56) References Cited

OTHER PUBLICATIONS

Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart Internatinoal Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna", U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.

* cited by examiner

COMPONENT OF WIRELESS IC DEVICE AND WIRELESS IC DEVICE

BACKGROUND OF THE INVENTION

1. Field of the Invention

The present invention relates to a component of a wireless IC device including a wireless IC for use with an RFID (Radio Frequency Identification) system, and also relates to the wireless IC device.

2. Description of the Related Art

Recently, as an article management system, an RFID system has been developed in which communication is performed between a reader/writer that generates an induced electromagnetic field and an IC chip (also referred to as an IC tag, a wireless tag, or a wireless IC chip) with a non-contact method so that information is transferred, the IC chip including predetermined information stored therein and being provided in an article, a container, or other object. It is possible for an IC chip, as a result of being connected to an antenna, that is, a radiation plate, to communicate with a reader/writer. As a wireless tag including an IC chip provided therein, a wireless tag is disclosed in Japanese Unexamined Patent Application Publication No. 2005-244778.

This wireless tag is defined by an IC chip and includes a main antenna element arranged on either side of the IC chip, a matching unit disposed between the IC chip and the main antenna element, and an auxiliary antenna element arranged in proximity to the inner side end surface of the main antenna element. In such a wireless tag, the matching unit matches the impedance of the IC chip to that of the main antenna element, and transmission and reception of a signal is performed by the main antenna element, thereby functioning as a wireless tag.

However, in the wireless tag, since the matching units arranged on the sides of the IC chip are arranged in a planar configuration on a dielectric substrate, an electromagnetic field generated in the matching units extends outside of the dielectric substrate. For this reason, when the wireless tag is laminated on an article, the dielectric constant in the vicinity of the matching units is changed, thereby causing the inductance value and the capacitance value of the matching units to be changed, and the matching state between the IC chip and the main antenna element is changed. As described above, if the matching state between the IC chip and the main antenna element is changed, desired radiation characteristics are not obtained in the main antenna element, and a communication problem occurs with the reader/writer that performs wireless communication with the wireless tag, which presents a problem in that the operation of the wireless tag is unstable.

Furthermore, in the wireless tag, another problem is that since matching units are arranged on the sides of the IC chip on a dielectric substrate, the size of wireless tag is increased.

Furthermore, in the wireless tag, since an IC chip is arranged so as to be viewable externally on a dielectric substrate, after a wireless tag is laminated on an article, there is a possibility that the IC chip contacts another article when the article is moved or carried, which presents another problem in that the IC chip may be damaged or may detach from the dielectric substrate due to impact, and thus, the wireless tag does not operate as a wireless tag. Furthermore, another problem is that when the IC chip is exposed to the outside, corrosion due to temperature and humidity in the periphery of the wireless tag, or other environmental factors occurs and the environmental resistance performance of the wireless tag is poor.

SUMMARY OF THE INVENTION

To overcome the problems described above, preferred embodiments of the present invention provide a small, low-profile component of a wireless IC device that provides stable operation due to improved mechanical strength and environmental resistance performance without changing the impedance matching state between the wireless IC and a radiation plate, and a wireless IC device.

A component of a wireless IC device according to a preferred embodiment of the present invention includes a wireless IC, and a feeding circuit substrate that includes a feeding circuit including a resonance circuit including an inductance element that is coupled to the wireless IC, and/or a matching circuit, the wireless IC being included in the feeding circuit substrate, wherein the feeding circuit substrate is a multilayered substrate including a plurality of resin layers and a plurality of electrodes that are laminated.

In the component of a wireless IC device, the wireless IC chip is preferably included in a feeding circuit substrate including a feeding circuit. With this a configuration, the mechanical strength of the component of a wireless IC device is increased, which enables the component of a wireless IC device to operate stably. Furthermore, by configuring the feeding circuit substrate as a multilayered substrate using a resin, the area and height of the component of a wireless IC device can be decreased. In addition, since the feeding circuit including a matching circuit is provided on a multilayered substrate, the component is negligibly affected by an article arranged close to the periphery of the substrate, and a change in the impedance matching state is prevented.

A wireless IC device according to another preferred embodiment of the present invention preferably further includes a radiation plate that is electromagnetically coupled to the feeding circuit.

Preferably, the feeding circuit substrate includes a first main surface and a second main surface, and the feeding circuit is arranged between the wireless IC and the first main surface in the lamination direction of resin layers and between the wireless IC and the second main surface. With such a configuration, the wireless IC device operates as a wireless IC device having desired characteristics. Furthermore, the arrangement area of the feeding circuit is increased, and the degree of design freedom of the circuit scale and the arrangement position are improved.

A stress alleviating electrode arranged to alleviate a stress on the wireless IC may preferably be arranged directly above and/or directly below the wireless IC. By arranging an electrode directly above or directly below the wireless IC, when a stress caused by an impact, for example, is applied to the feeding circuit substrate, the stress is alleviated by the electrode, which reduces the stress on the wireless IC. As a result, the mechanical strength of the wireless IC device is effectively improved.

Preferably, the inductance element is defined by at least one annular electrode having a substantially annular shape by a via hole conductor provided in the feeding circuit substrate and the plurality of electrodes, and the winding axis of the annular electrode is perpendicular or substantially perpendicular to the lamination direction of the feeding circuit substrate. With this configuration, a magnetic field is generated on the inner side of the annular electrode and in a direction perpendicular or substantially perpendicular to the lamination direction of the feeding circuit substrate. As a result, when the feeding circuit substrate is arranged in proximity to an article using the second main surface of the feeding circuit substrate as a mounting surface, a magnetic field is generated in parallel or substantially in parallel with the mounting surface. Therefore, the electromagnetic field generated by the feeding circuit is not significantly affected by the article, and stabilized communication characteristics are obtained. Furthermore, since a via hole conductor inside the feeding circuit substrate defines a portion of the inductance element, the Q value of the inductance element is increased. Thus, a feeding circuit having satisfactory electrical characteristics is provided.

Preferably, when the annular electrode is viewed from a direction perpendicular or substantially perpendicular to the lamination direction, the wireless IC is arranged on an inner side of the annular electrode and a portion of the annular electrode is arranged in proximity to the radiation plate. With such a arrangement, the entire feeding circuit substrate can used to configure the feeding circuit, and thus, the degree of design freedom of the feeding circuit is significantly increased. Furthermore, since the feeding circuit can be arranged in proximity to the main surface to be coupled to the radiation plate, the coupling between the feeding circuit and the radiation plate can be increased, and radiation characteristics of the signal in the radiation plate can be significantly improved.

The feeding circuit may preferably include capacitance elements arranged such that the plurality of electrodes oppose one another, and the plurality of electrodes defining the capacitance elements may also define the stress alleviating electrodes. As a result of the electrodes defining the capacitance elements being arranged in a direction perpendicular or substantially perpendicular to the lamination direction of the feeding circuit substrate, the direction of the magnetic field generated in the annular electrode defining the inductance element is parallel or substantially parallel to the extension direction of the electrodes. As a result, the magnetic field generated in the inductance element is not disturbed by the electrodes defining the capacitance element, desired design values can be obtained, and a feeding circuit having predetermined resonance characteristics and matching characteristics can be obtained. Furthermore, the electrodes defining the capacitance element may define a stress alleviating electrode, the electrode being arranged directly above and/or directly below the wireless IC. With such a configuration, the number of electrode layers inside the feeding circuit substrate are decreased, and the area and height of the wireless IC device are further decreased.

Preferably, the feeding circuit substrate includes a flexible portion and a rigid portion, and the wireless IC is arranged in the rigid portion. Since the feeding circuit substrate includes a plurality of resin layers, the feeding circuit substrate is flexible. However, if the feeding circuit substrate is configured to be partially rigid and a wireless IC is arranged in the rigid portion, the stress on the wireless IC can be effectively reduced. The portion in which the annular electrode and the stress alleviating electrode are provided defines a rigid portion in which bending is prevented. In particular, if the annular electrode is formed using a copper foil, it is possible to make the inner side portion of the annular electrode rigid.

Preferably, a frequency of a signal that is transmitted and received in the radiation plate is substantially determined in accordance with a resonance frequency of the feeding circuit. As described above, by substantially determining the frequency of the signal to be used for communication based on the resonance frequency in the feeding circuit, even if the shape or the material of an article in which the radiation plate and the wireless IC device are mounted is changed, the frequency of the signal that is transmitted and received by the radiation plate is not significantly changed. For this reason, even if the wireless IC device is laminated on various articles or even if an article in which the wireless IC device is laminated is deformed, a malfunction does not occur, and the operation of the wireless IC device can be stabilized.

According to various preferred embodiments of the present invention, since a multilayered substrate includes a plurality of resin layers and a plurality of electrodes that are laminated, the area and height of the component of a wireless IC device and the wireless IC device can be decreased. Furthermore, by including the wireless IC chip in the feeding circuit substrate, the wireless IC chip can securely protected. Thus, a component of a wireless IC device and a wireless IC device having improved mechanical strength and environment resistance performance are provided.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Figure 1:
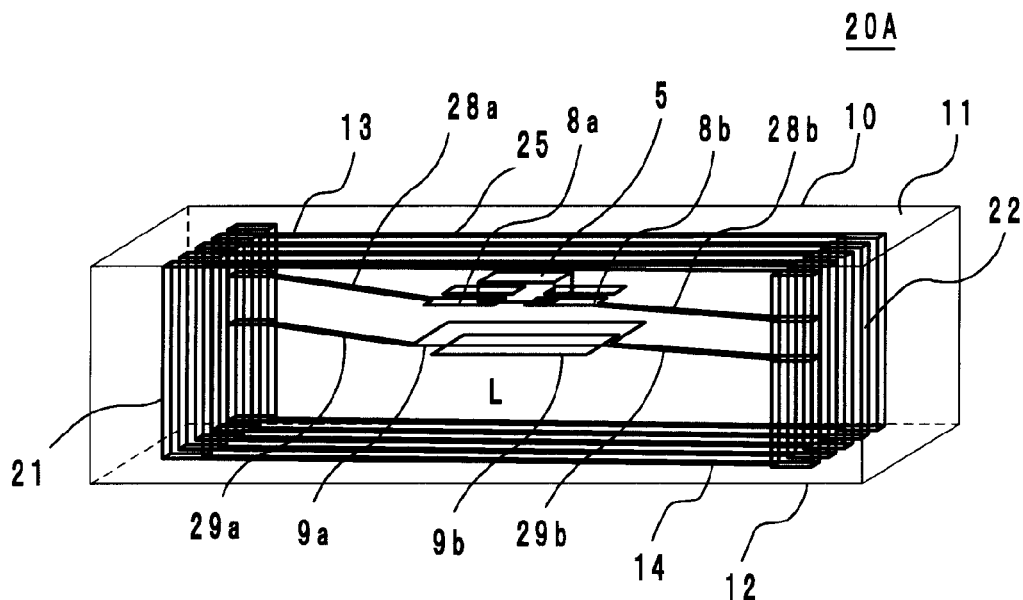
FIG. 1 is a perspective view showing a component of a wireless IC device according to a first preferred embodiment of the present invention.

Preferred embodiments of a component of a wireless IC device and the wireless IC device according to the present invention will be described below with reference to the attached drawings. In the figures, common elements and portions are designated with the same reference numerals, and duplicated descriptions thereof are omitted.

First Preferred Embodiment

Figure 2:
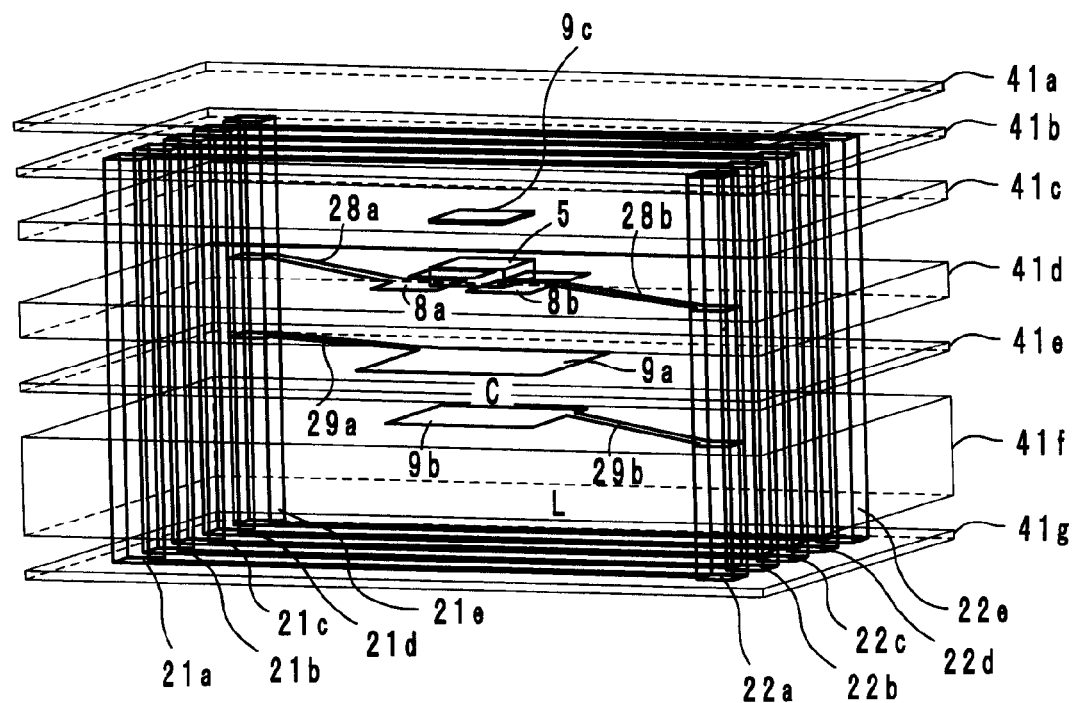
FIG. 2 is an exploded perspective view showing the component of a wireless IC device shown in FIG. 1.

FIGS. 1 and 2 show a component 20A of a wireless IC device according to a first preferred embodiment of the present invention. FIG. 1 is a perspective view showing the internal structure of the component 20A of a wireless IC device. FIG. 2 is an exploded perspective view of each of the resin layers defining the component 20A of a wireless IC device. The component 20A of a wireless IC device is defined by a wireless IC chip 5 arranged to process a transmission/reception signal of a predetermined frequency, and a feeding circuit substrate 10 including the wireless IC chip 5 provided therein.

Figure 3:
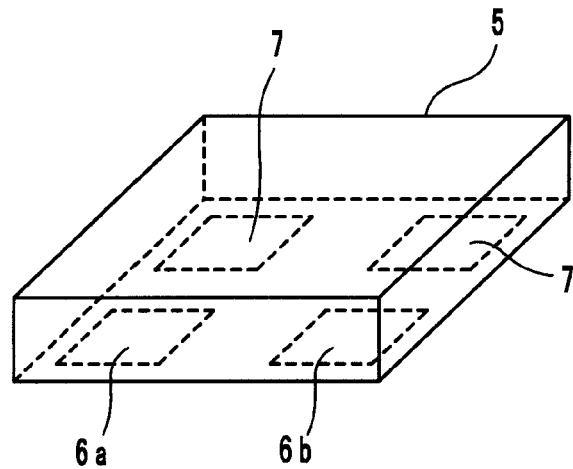
FIG. 3 is a perspective view showing a wireless IC chip.

The wireless IC chip 5 preferably includes a clock circuit, a logic circuit, a memory circuit, and other suitable circuits, and includes necessary information stored therein. FIG. 3 is a perspective view showing the wireless IC chip 5 including input-output electrodes 6a and 6b and mounting terminal electrodes 7 and 7 provided on the reverse surface of the wireless IC chip 5. The input/output electrodes 6a and 6b are electrically connected to electrodes 8a and 8b provided inside the feeding circuit substrate 10 via metal bumps, for example. As materials for the metal bump, Au, solder, and other suitable material, for example, may preferably be used.

On a first main surface 11 of the feeding circuit substrate 10, a plurality of linear electrodes 13 preferably made of Cu, for example, are arranged side by side so as to be parallel or substantially parallel to each other on the first main surface 11. Furthermore, on a second main surface 12 of the feeding circuit substrate 10, a plurality of linear electrodes are arranged side by side so as to be parallel or substantially parallel to each other on the second main surface 12. Then, a plurality of via hole conductors 21 and 22 arranged to connect the end portions of the linear electrode 13 and the end portions of the linear electrode 14, respectively, are provided inside the feeding circuit substrate 10. Inside the feeding circuit substrate 10, an annular electrode 25 is defined by the linear electrode 13, the linear electrode 14, and the via hole conductors 21 and 22. Then, adjacent annular electrodes are preferably connected to one another so as to have a spiral shape when the annular electrode 25 is viewed from a direction perpendicular or substantially perpendicular to the lamination direction of the resin layers of the feeding circuit substrate 10. Then, the annular electrode 25 is connected to the electrodes 8a and 8b via connection electrodes 28a and 28b at predetermined locations, i.e., the via hole conductors 21 and 22 located at both end portions of a coil.

Below the wireless IC chip 5 in the feeding circuit substrate 10, substantially rectangular flat plate electrodes 9a and 9b are preferably arranged such that at least portions thereof overlap each other. Then, the flat plate electrodes 9a and 9b are preferably connected to predetermined locations, i.e., the via hole conductors 21 and 22 located in both end portions of a coil, of the annular electrode 25 via connection electrodes 29a and 29b, respectively. Furthermore, when the annular electrode 25 is viewed from a direction perpendicular or substantially perpendicular to the lamination direction of the feeding circuit substrate 10, the wireless IC chip 5 and the flat plate electrodes 9a and 9b are preferably arranged on the inside of the annular electrode 25.

Furthermore, as shown in the exploded perspective view of FIG. 2, the feeding circuit substrate 10 is preferably defined by a plurality of linear electrodes 13 and 14, electrodes 8a and 8b, flat plate electrodes 9a and 9b, and connection electrodes 28a 28b, 29a, and 29b, which are provided on resin layers 41a to 41g, and via hole conductors 21a to 21e, and 22a to 22e arranged so as to extend through the resin layers 41b to 41f, respectively. As materials of the resin layers in the component 20A of a wireless IC device in the present preferred embodiment, a liquid-crystal polymer or polyimide, for example, may preferably be used. The plurality of linear electrodes 13 and 14, the electrodes 8a and 8b, the flat plate electrodes 9a and 9b, and the connection electrodes 28a, 28b, 29a, and 29b are preferably formed by etching electrodes made of Cu, for example, or other suitable material, on the resin layers 41a to 41g. Furthermore, the via hole conductors 21a to 21e, and 22a to 22e are preferably formed such that resin layers are punched using a laser, a mechanical punch, or other suitable mechanism, for example, and a conductive material, such as Ag or Cu, for example, is preferably filled and cured in the hole. Furthermore, the wireless IC chip 5 is mounted on the electrodes 8a and 8b disposed on a predetermined resin layer, and by laminating and crimping the resin layer and the other resin layers, the feeding circuit substrate 10 is obtained.

The plurality of linear electrodes 13 and 14 may be provided on the same resin layer or may be provided on different resin layers. By providing the linear electrodes 13 and 14 on different resin layers, the amount of coupling by the electromagnetic field among the linear electrodes can be effectively adjusted. Furthermore, the linear electrodes 13 and 14 may be arranged inside the feeding circuit substrate 10 and also on the first main surface 11 or the second main surface 12.

Figure 5:
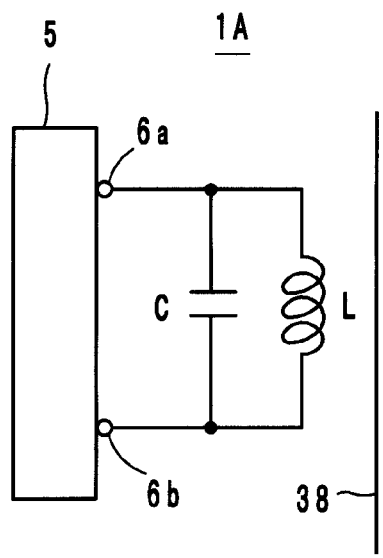
FIG. 5 is an equivalent circuit diagram of the wireless IC device shown in FIG. 4.

In the component 20A of a wireless IC device, the annular electrode 25 including the linear electrodes 13 and 14 and the via hole conductors 21 and 22 defines an inductance element L in the feeding circuit. In the inductance element L, since a plurality of annular electrodes 25 are connected in a spiral shape, when the annular electrodes 25 are viewed from a direction perpendicular or substantially perpendicular to the lamination direction, a magnetic field is generated so as to pass through the inside of the plurality of annular electrodes. Furthermore, the plurality of annular electrodes 25 are preferably connected to the wireless IC chip 5 via connection electrodes 28a and 28b at predetermined locations. For this reason, when viewed from the wireless IC chip 5, as shown in FIG. 5, the annular electrodes 25 are arranged such that the inductance element L is connected to both ends of the wireless IC chip.

Furthermore, below the wireless IC chip 5, opposing flat plate electrodes 9a and 9b are provided and define a capacitance element C (see FIG. 5). The two flat plate electrodes 9a and 9b are connected in parallel to the annular electrode 25, which defines an inductance element L, via connection electrodes 29a and 29b at predetermined locations, thereby defining a resonance circuit or a matching circuit. In the present preferred embodiment, in the feeding circuit substrate 10, by arranging feeding circuits above and below the wireless IC chip 5, many circuit elements can be arranged inside the feeding circuit substrate 10. Thus, the area and height of the component 20A of a wireless IC device can be effectively decreased, and the degree of design freedom of the feeding circuit is increased.

The flat plate electrodes 9a and 9b arranged below the wireless IC chip 5 also define stress alleviating electrodes. In a preferred embodiment of the present invention, since the feeding circuit substrate 10 includes soft resins, when an impact or other force is externally applied to the component 20A of a wireless IC device, a warp occurs in the feeding circuit substrate 10. When a stress due to the warp is applied to the wireless IC chip 5, since the wireless IC chip is bent or warped, there is a possibility that the wireless IC chip 5 will be damaged. Furthermore, even if the wireless IC chip 5 is not damaged, as a result of a warp occurring in the feeding circuit substrate 10, a connection problem occurs between the wireless IC chip 5 and the electrodes 8a and 8b, and a problem may arise in that the component of a wireless IC device does not operate as a component of a wireless IC device. In that case, the flat plate electrodes 9a and 9b arranged below the wireless IC chip 5 effectively alleviate the stress and prevent the warp from being generated in the feeding circuit substrate 10, so that damage to the wireless IC chip 5 and malfunction thereof due to a connection problem are prevented. Furthermore, since the flat plate electrodes 9a and 9b are arranged in parallel or substantially in parallel to the direction of the magnetic field generated in the annular electrode 25, the magnetic field is not disturbed, and predetermined characteristics of the resonance circuit or the matching circuit can be obtained.

In the present preferred embodiment, the two flat plate electrodes 9a and 9b are arranged below the wireless IC chip 5. By arranging the flat plate electrodes 9a and 9b above the wireless IC chip in addition to below the wireless IC chip (see a flat plate electrode 9c in FIG. 2), it is possible to further reduce a stress on the wireless IC chip 5, and the mechanical strength of the component 20A of a wireless IC device can be further increased. Furthermore, the number of the flat plate electrodes 9a and 9b does not necessarily need to be two, and three or more of the flat plate electrodes may preferably be arranged to obtain a predetermined capacitance value. Furthermore, the flat plate electrodes 9a and 9b instead of the annular electrodes 25 may be arranged on the second main surface side of the feeding circuit substrate 10. By arranging the flat plate electrodes 9a and 9b on the second main surface of the feeding circuit substrate 10, it is possible to electromagnetically couple the radiation plate and the feeding circuit. As a result, it is possible to adjust the amount of the electromagnetic field coupling between the radiation plate and the feeding circuit, and it is possible to control radiation characteristics of the signal from the radiation plate.

Figure 4:
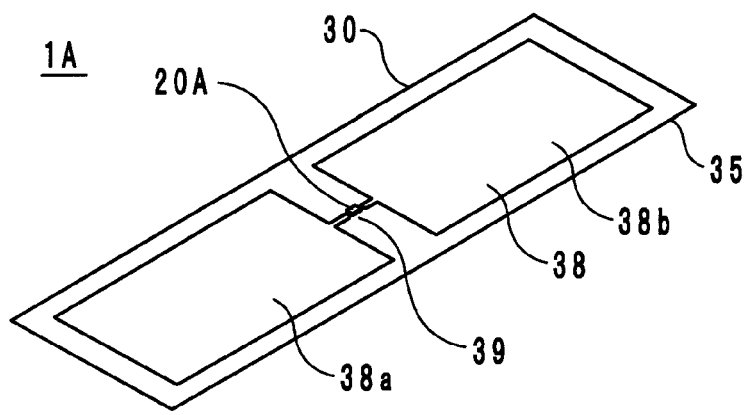
FIG. 4 is a perspective view showing a wireless IC device including the component of a wireless IC device according to the first preferred embodiment of the present invention.

A preferred embodiment of the present invention in which the component 20A of a wireless IC device is combined with a radiation plate 30 so as to define a wireless IC device 1A is shown in FIG. 4. The radiation plate 30 preferably includes a radiation electrode 38 provided on a substrate 35, such as a PET film, for example. The radiation electrode 38 includes a coupling unit 39 arranged to couple with the component 20A of a wireless IC device, with the coupling unit 39 being arranged in the central portion of the radiation electrode 38 in the longitudinal direction thereof. Then, the component 20A of a wireless IC device is mounted on the coupling unit 39 using an adhesive, for example. Furthermore, the radiation electrode 38 is provided on both sides of the component 20A of a wireless IC device when viewed from the component 20A of a wireless IC device and has a dipole shape. The radiation electrode 38 includes wide portions 38a and 38b at both end portions, such that radiation characteristics and the directivity are improved.

The feeding circuit and the coupling unit 39 in the component 20A of a wireless IC device are arranged so as to be electrically insulated from each other, and the feeding circuit and the coupling unit 39 are electromagnetically coupled to each other by a magnetic field generated in the annular electrode 25 (inductance element L) of the feeding circuit. The feeding circuit substrate 10 includes a resonance circuit (an inductance element L and a capacitance element C) having a predetermined resonance frequency, such that a transmission signal having a predetermined frequency, which is sent from the wireless IC chip 5, is transmitted to the radiation electrode 38, a received signal having a predetermined frequency is selected from the signals received by the radiation electrode 38, and the signal is supplied to the wireless IC chip 5. Therefore, in this wireless IC device 1A, the wireless IC chip 5 is operated in accordance with the signal received by the radiation electrode 38 and a response signal from the wireless IC chip 5 is radiated to the outside from the radiation electrode 38.

An equivalent circuit of the wireless IC device 1A is shown in FIG. 5. As shown in FIG. 5, the feeding circuit substrate 10 includes a feeding circuit having a resonance circuit, and a matching circuit having an inductance element L and a capacitance element C. Furthermore, the inductance element L is magnetically coupled to a corresponding one of the radiation electrodes 38, and this feeding circuit is connected to the wireless IC chip 5.

In the feeding circuit substrate 10, resonance frequency characteristics are determined in the resonance circuit defined by the inductance element L and the capacitance element C. The resonance frequency of the signal radiated from the radiation electrode 38 is substantially determined by the self-resonance frequency of the resonance circuit.

The resonance circuit may also function as a matching circuit arranged to match the impedance of the wireless IC chip 5 to the impedance of the radiation electrode 38. The feeding circuit substrate 10 may preferably include a matching circuit that is provided separately from the resonance circuit defined by the inductance element L and the capacitance element C. If the function of the matching circuit is added to the resonance circuit, the design of the resonance circuit tends to be very complex. If a matching circuit is provided separately from the resonance circuit, the resonance circuit and the matching circuit can be designed independently of each other.

As described above, in the wireless IC device 1A, since the wireless IC chip 5 is included in the feeding circuit substrate 10 including resin layers, and feeding circuits can be arranged above and below the wireless IC chip, the degree of design freedom of the feeding circuits can be increased, and the area and height of the feeding circuit substrate 10 can be decreased. Furthermore, since the wireless IC chip 5 is included in the feeding circuit substrate 10, the mechanical strength and the environment resistance performance of the wireless IC chip 5 is increased.

Second Preferred Embodiment

Figure 6:
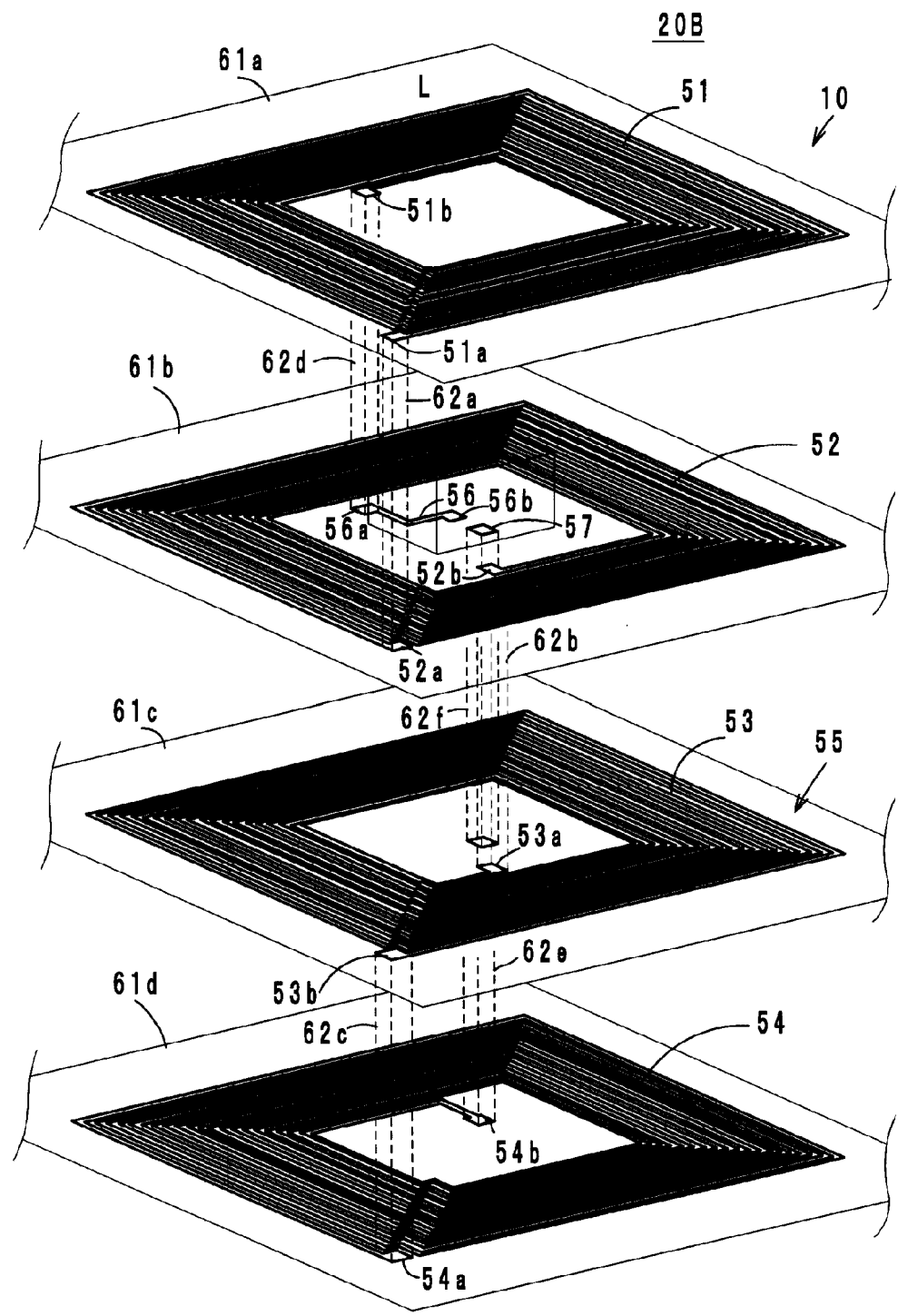
FIG. 6 is an exploded perspective view showing a component of a wireless IC device according to a second preferred embodiment of the present invention.

FIG. 6 shows a component 20B of a wireless IC device according to a second preferred embodiment of the present invention. Similar to the first preferred embodiment, the component 20B is configured such that an annular electrode 55 (inductance element L) is defined by spiral electrodes 51, 52, 53, and 54 inside the feeding circuit substrate 10, and the wireless IC chip 5 is included therein.

The spiral electrodes 51 to 54 are arranged on the resin layers 61a to 61d, an end portion 51a of the spiral electrode 51 is connected to an end portion 52a of the spiral electrode 52 via a via hole conductor 62a, and an end portion 52b of the spiral electrode 52 is connected to an end portion 53a of the spiral electrode 53 via a via hole conductor 62b. Furthermore, an end portion 53b of the spiral electrode 53 is connected to an end portion 54a of the spiral electrode 54 via a via hole conductor 62c.

An end portion 51b of the spiral electrode 51 is connected to an end portion 56a of the linear electrode 56 provided on the resin layer 61b via a via hole conductor 62d, and an end portion 56b of the linear electrode 56 is connected to an input/output electrode 6a (see FIG. 3) of the wireless IC chip 5. An end portion 54b of the spiral electrode 54 is connected to the electrode 57 provided on the resin layer 61b via a via hole conductor 62e, and the electrode 57 is connected to the input/output electrode 6b of the wireless IC chip 5.

Figure 7:
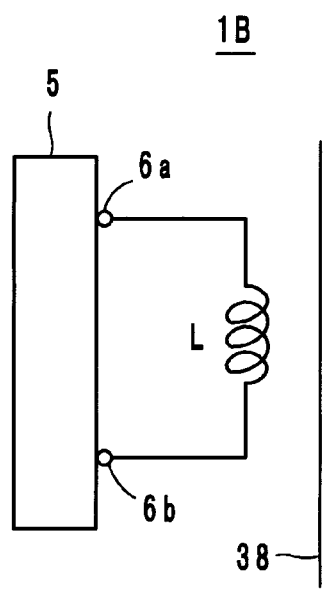
FIG. 7 is an equivalent circuit diagram of the wireless IC device including the component of a wireless IC device according to the second preferred embodiment of the present invention.

In the component 20B of a wireless IC device, as shown in FIG. 7, the annular electrode 55 (inductance element L) defined by the spiral electrodes 51 to 54 is connected in series with the wireless IC chip 5, and the inductance element L is electromagnetically coupled to the radiation electrode 38.

The operational effect of the wireless IC device 1B including the components described above is the same or substantially the same as that of the first preferred embodiment. The wireless IC chip 5 is operated in accordance with a signal received by the radiation electrode 38, and a response signal from the wireless IC chip 5 is radiated to the outside from the radiation electrode 38. In the feeding circuit substrate 10 of the second preferred embodiment, the inner side area of the annular electrode 55 is a rigid area. That is, since the feeding circuit substrate 10 includes a plurality of resin layers, the feeding circuit substrate 10 is flexible. However, since the bending thereof is suppressed by the annular electrode 55 defined by the spiral electrodes 51 to 54, the area inside of the annular electrode 55 is rigid area. In particular, in the second preferred embodiment, since the spiral electrodes 51 to are wound a plurality of times, the area inside of the annular electrode 55 is more rigid than in the first preferred embodiment. Then, since the wireless IC chip 5 is arranged in the rigid area, it is possible to reduce a stress on the wireless IC chip 5. The flat plate electrode 9c arranged to alleviate stress, shown in FIG. 2, may be provided in the area inside of the annular electrode 55. As a result, since the rigid area of the area inside of the annular electrode 55 is more rigid, it is possible to reduce the stress on the wireless IC chip 5 to a greater extent.

Third Preferred Embodiment

Figure 8:
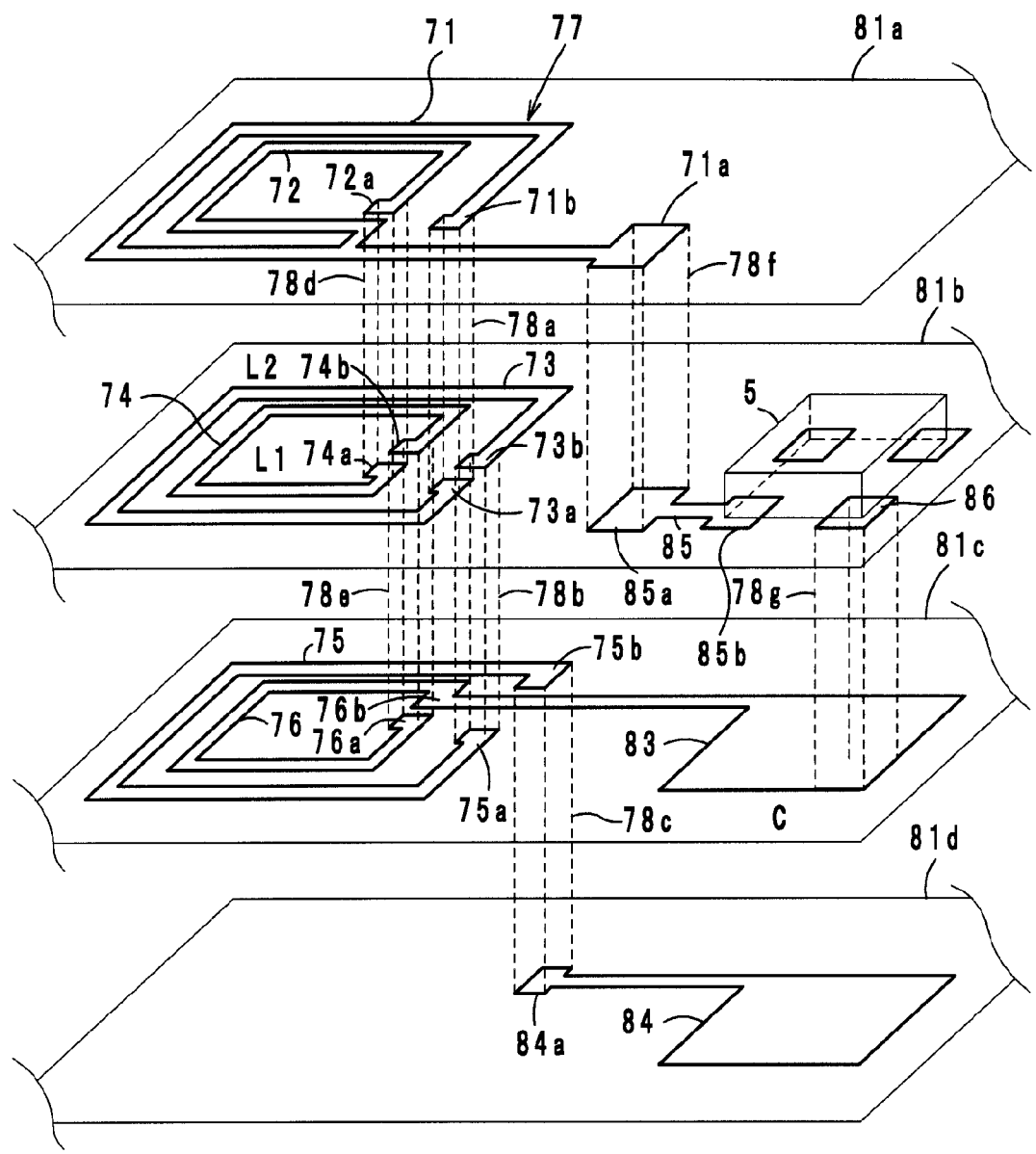
FIG. 8 is an exploded perspective view showing a component of a wireless IC device according to a third preferred embodiment of the present invention.

FIG. 8 shows a component 20C of a wireless IC device according to a third preferred embodiment of the present invention. Similar to the first preferred embodiment, the component 20C is configured such that an annular electrode 77 (inductance elements L1 and L2), and opposing flat plate electrodes 83 and 84 (capacitance elements C) are defined by double linear electrodes 71, 72, 73, 74, 75, and 76 inside the feeding circuit substrate 10, and the wireless IC chip 5 is included therein.

The linear electrodes 71 to 76 are provided on resin layers 81a to 81c, an end portion 71b of the linear electrode 71 is connected to an end portion 73a of the linear electrode 73 via a via hole conductor 78a, and an end portion 73b of the linear electrode 73 is connected to an end portion 75a of the linear electrode 75 via a via hole conductor 78b. An end portion 75b of the linear electrode 75 is connected to an end portion 84a of the flat plate electrode 84 provided on the resin layer 81d via a via hole conductor 78c. The linear electrode 72 is arranged to branch from the linear electrode 71, an end portion 72a is connected to an end portion 74a of the linear electrode 74 via a via hole conductor 78d, and an end portion 74b of the linear electrode 74 is connected to an end portion 76a of the linear electrode 76 via a via hole conductor 78e. Furthermore, an end portion 76b of the linear electrode 76 is connected to the flat plate electrode 83.

An end portion 71a of the linear electrode 71 is connected to an end portion 85a of the electrode 85 provided on the resin layer 81b via a via hole conductor 78f, and an end portion 85b of the electrode 85 is connected to the input/output electrode 6a of the wireless IC chip 5 (see FIG. 3). The flat plate electrode 83 is connected to the electrode 86 provided on the resin layer 81b via a via hole conductor 78g, and the electrode 86 is connected to the input/output electrode 6b of the wireless IC chip 5.

Figure 9:
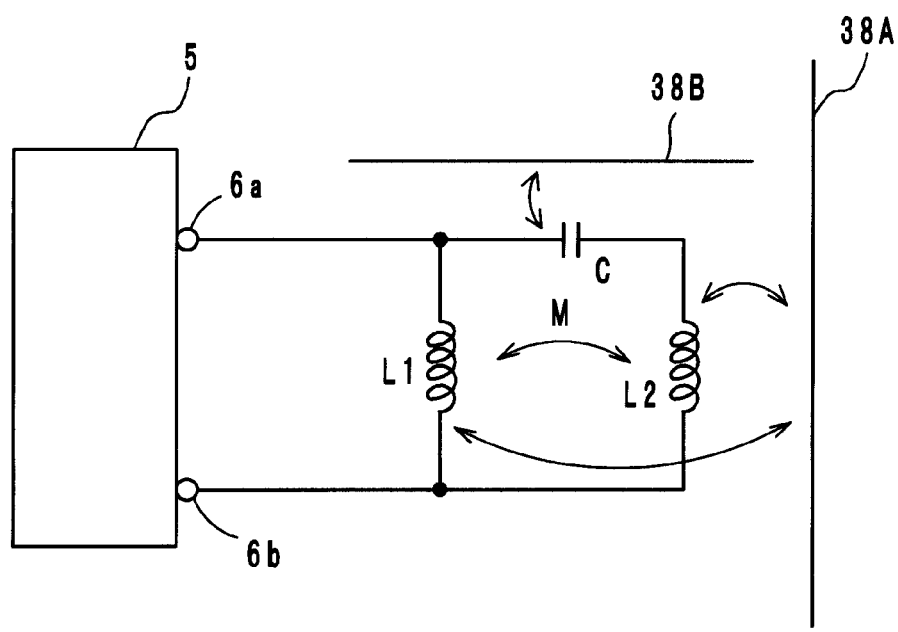
FIG. 9 is an equivalent circuit diagram of a wireless IC device including the component of a wireless IC device according to the third preferred embodiment of the present invention.

In the component 20C of a wireless IC device, as shown in FIG. 9, inductance elements L1 and L2 are defined by the annular electrode 77 that is defined by the linear electrodes 71 to 76, and the inductance elements L1 and L2 are magnetically coupled to one another (indicated by mutual inductance M). The inductance elements L1 and L2 and the capacitance element C (flat plate electrodes 83 and 84) that is connected in series with one end of each of the inductance elements L1 and L2 define a feeding circuit including a resonance circuit and a matching circuit. Furthermore, the inductance elements L1 and L2 are each magnetically coupled to the radiation electrode 38A, and the capacitance element C is electrically coupled to the radiation electrode 38B.

The operational effect of the wireless IC device IC according to the third preferred embodiment is the same or substantially the same as that of the first preferred embodiment. The wireless IC chip 5 is operated in accordance with a signal received by the radiation electrodes 38A and 38B, and a response signal from the wireless IC chip 5 is radiated to the outside from the radiation electrodes 38A and 38B. In the feeding circuit substrate 10 according to the third preferred embodiment, the portion in which the area inside of the annular electrode 77 and the flat plate electrodes 83 and 84 are provided is a rigid area. Since the wireless IC chip 5 is arranged directly above the flat plate electrodes 83 and 84 and is located in a rigid area, it is possible to reduce a stress on the wireless IC chip 5.

As described above, preferred embodiments of the present invention are useful for a component of a wireless IC device and a wireless IC device. In particular, preferred embodiments of the present invention are superior in that the wireless IC device can stably operate without changing the impedance matching state of a wireless IC and a radiation plate.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A component of a wireless IC device, comprising:
   a wireless IC chip; and
   a feeding circuit substrate including at least one of a resonance circuit or a matching circuit including an inductance element coupled to the wireless IC chip; wherein
   the feeding circuit substrate is a multilayered substrate including a plurality of resin layers;
   the inductance element is defined by a plurality of electrodes;
   both of the wireless IC chip and the plurality of electrodes defining the inductance element are provided within the multilayered substrate;
   connection portions between the wireless IC chip and the plurality of electrodes defining the inductance element are provided within the multilayered substrate;
   the plurality of electrodes defining the inductance element include at least one annular electrode having an annular shape and including via hole conductors provided in the feeding circuit substrate;
   a winding axis of the at least one annular electrode is perpendicular or substantially perpendicular to a lamination direction of the plurality of resin layers;
   each of the via hole conductors is defined by a conductive material that is filled and cured in a hole in the plurality of resin layers; and
   the wireless IC chip is disposed within an area of the feeding circuit substrate that is surrounded on at least two sides by a plurality of the via hole conductors.

2. The component of a wireless IC device according to claim 1, wherein the feeding circuit substrate includes a first main surface and a second main surface, and the at least one of the resonance circuit or the matching circuit is arranged between the wireless IC chip and the first main surface in a lamination direction of the plurality of resin layers and between the wireless IC chip and the second main surface in the laminated direction.

3. The component of a wireless IC device according to claim 1, wherein at least one stress alleviating electrode arranged to alleviate a stress on the wireless IC chip is arranged directly above and/or directly below the wireless IC chip.

4. The component of a wireless IC device according to claim 3, wherein
   the feeding circuit substrate includes a flexible portion and a rigid portion;
   the wireless IC chip is arranged in the rigid portion; and
   the rigid portion is defined by a portion of the feeding circuit substrate in which the at least one stress alleviating electrode is disposed.

5. The component of a wireless IC device according to claim 1, wherein the at least one of the resonance circuit or the matching circuit includes capacitance elements defined by another plurality of electrodes that oppose one another.

6. The component of a wireless IC device according to claim 5, wherein the another plurality of electrodes defining the capacitance elements also define stress alleviating electrodes arranged to alleviate a stress on the wireless IC chip.

7. The component of a wireless IC device according to claim 1, wherein
the feeding circuit substrate includes a flexible portion and a rigid portion;
the wireless IC chip is arranged in the rigid portion.

8. The component of a wireless IC device according to claim 7, wherein the rigid portion is defined by a portion of the feeding circuit substrate in which the plurality of electrodes defining the inductance element are disposed.

9. A wireless IC device comprising:
the component of a wireless IC device according to claim 1; and
a radiation plate arranged to be electromagnetically coupled to the at least one of the resonance circuit or the matching circuit.

10. The wireless IC device according to claim 9, wherein a portion of the plurality of electrodes defining the inductance element is arranged in proximity to the radiation plate.

11. The wireless IC device according to claim 9, wherein a frequency of a signal that is transmitted and received in the radiation plate is substantially determined by a resonance frequency of the at least one of the resonance circuit or the matching circuit.

* * * * *